Jan. 23, 1973    A. G. RATTEN ET AL    3,712,844
SEALING OF FOAM PLASTIC SHEETS
Filed June 15, 1970    2 Sheets-Sheet 1

INVENTOR.
A. G. RATTEN
J. H. VAN BREDERODE
BY
*Hugh A Kirk*
ATTORNEY

Jan. 23, 1973  A. G. RATTEN ET AL  3,712,844
SEALING OF FOAM PLASTIC SHEETS
Filed June 15, 1970  2 Sheets-Sheet 2

INVENTOR.
A. G. RATTEN
BY J. H. VAN BREDERODE

ATTORNEY 3,712,844
SEALING OF FOAM PLASTIC SHEETS
Antonius G. Ratten, Jan H. van Brederode, Delft, Netherlands, assignors to Stichting Ontwikkeling Verpakkingsmethoden In de Zuivelindustrie, The Hague, Netherlands
Filed June 15, 1970, Ser. No. 46,431
Claims priority, application Netherlands, June 18, 1969, 6909334
Int. Cl. B32b 3/04, 7/10; B29c 27/00
U.S. Cl. 161—38
22 Claims

ABSTRACT OF THE DISCLOSURE

The invention relates to a method for overlapping sealing foam plastic films or foam plastic sheets with a density below 250 kg. per m.$^3$, which are laid on top of each other without a bonding agent and are compressed in dies at a temperature above the softening point of the plastic. Thereafter the pressure is reduced, so that the compressed product foams rapidly again to form a new integral sheet of a predetermined foam plastic thickness, at which time it is cooled to reform the product for example, a single blank folded into a container having a bottom consisting of flaps folded into each other, and a side seam can all be sealed and reformed into an integrated whole with a final thickness substantially equal to the thickness of one single sheet.

BACKGROUND OF THE INVENTION

Joining foam plastic films by means of heat sealing is of importance when containers are manufactured, such as boxes, cups and bottles for handling and transporting various substances and products including hot or cooled substances. With bottles and other containers of one litre or more the application of foam plastic is also of importance with respect to the low cost price. For example, in a reasonably rigid 1 litre bottle made of non-cellular polystyrene about 25 grams of the said plastic must be processed, and this bottle is not even impact-proof or shockproof. Yet a one litre bottle made of polystyrene foam need only weigh 10 grams to be sufficiently rigid, impact-proof and shock-proof.

Joining plastic films with the aid of a bonding agent is known in the art. The use of bonding agents has various disadvantages, however. At first their drying-times are usually too long; therefore storage room is required to dry the products. Then the presence of a wet bonding agent on the parts to be joined, makes handling in the process less convenient. Moreover, a bonded seam often disintegrates when it comes into contact with certain liquids. The presence of a bonding agent or a solvent for the bonding agent, which is absorbed in the container, is often undesirable. When, for instance, liquid foodstuffs are to be packed in such a container. At last, various plastics, such as, e.g. polyethylene, are difficult to join by means of a bonding agent.

The method according to the invention does not have these disadvantages and is characterized in that one or more thermoplastic foam films of foam sheets, having a density below 250 kg. per m.$^3$ preferably below 100 kg. per m.$^3$, with their parts to be joined laid on top of each other without a bonding agent, are enclosed on all sides or substantially on all sides by dies adapted to enclose a product in being and then are compressed at a temperature above the softening point of the plastic, whereafter the compressed product is foamed again at the same temperature by decreasing the pressure and sealed at a predetermined foam thickness by cooling at one side at least.

In this context, by "substantially enclosed on all sides" is understood that every film or sheet has at least its two largest surfaces entirely covered by the dies. The pressure is lowered, preferably by increasing the distance between the die sections, until a predetermined foam plastic thickness is reached.

According to the invention the hot dies may be removed and the just compressed product can be allowed to foam partially or completely and in a next process stage, where it also may be cooled either in the same or other die sections to fix the refoamed sheets to a predetermined thickness. This cooling may be by air blown against one side of the die or product. The end product is smooth if an apt choice of plastic material is made, and in any event the total thickness of the original number of overlapping layers is far greater than the wall thickness of the reformed end product or sheet. The pressure to be applied can be adapted to the nature and the density of the foam plastic on the one hand and to the sealing time on the other. At pressures below 2 kg. per cm.$^2$ correct seal can also be obtained but often the sealing time becomes unattractively long. In general, pressures above about 50 kg. per cm.$^2$ are not necessary. Higher pressures are often not desired for reasons of economy.

Preferably, the thermoplastic foam plastic films or foam plastic sheets enclosed in the dies are compressed by means of a pressure of at least 2 kg. per cm.$^2$.

Surprisingly, it has been found that foam plastic films and foam plastic sheets can be sealed in a very short time with the aid of the method according to the invention, while completely retaining a foam structure and without considerably thickened zones at the sealed seams. Besides, the sealed seams obtained are perfectly fluid-tight and the foam plastic films and the foam plastic sheets retain substantially all their properties.

For example, two sheets, having a thickness of 3 mm. consisitng of crosslinked polypropylene foam with a density of 70 kg. per m.$^3$, can be sealed overlappingly within 4 seconds with the aid of a pressure of 20 kg. per cm.$^2$ at a die temperature of 185° C. In the process, the polypropylene foam is temporarily compressed to about 20% of its original thickness.

Two sheets, having a thickness of 2.5 mm. and consisting of polystyrene foam having a density of 40 kg. per m.$^3$, can be overlappingly sealed within 6 seconds with the aid of a pressure of 4 kg. per cm.$^2$ at a die temperature of 128° C.

In general it is also possible to seal foam plastic films without enclosure on all sides or substantially on all sides. When, however, for instance, a surface of the same order of magnitude as the sealed seam is enclosed only, with a relatively narrow width of the overlap, the foam structure as well as the rigidity of the material are lost, and with broad seams an irregular seal with a less attractive appearance is obtained. Also sealing seams with a narrow overlap can be applied, without enclosure on all sides for sealing containers after filling.

The method according to the invention is particularly suitable for manufacturing containers from a blank manufactured from foam plastic. The blank is folded into the shape required and placed over a suitable heated mandrel. Then the outer side of the folded blank is enclosed on all sides with the aid of one or more heated die sections and pressed against the mandrel at a temperature above the softening temperature of the plastic. After compressing, the pressure is reduced and the distance between the mandrel and the external die sections is increased until the predetermined foam plastic thickness is obtained. In the process, the foam plastic expands again and then can be cooled. Cooling can be effected by cooling the heated mandrel and/or the die sections, by replacing the external hot die sections, by cold die sections or by placing the container thus shaped on to a cold mandrel and have it cooled into the shape desired with the aid of cold die sections.

In general a single blank is folded into an angular container. These angles, however, can be rounded, if desired, by compressing the blank on a mandrel an in external die sections with rounded corners. The container obtained may differ from the folde dblang at other points, too, for it is possible to profile the external die sections and/or the mandrel in order that the container can be provided with ribs, grooves, embossed sections, and the like.

A particular advantage of the method according to the invention, viz sealing the overlapping parts of the bottom of a folded blank for a box is that it is possible to obtain a box having walls of uniform thickness in spite of the fact that in some places there is only one layer of foam and in other places even four or more layers of foam are lying on top of each other before the sealing operation.

The method according to the invention can also be applied for manufacturing of cylindrical or truncated conical containers. Also if two plastic sheets are used to form the cylindrical wall and the bottom of the container they can be sealed together on a mandrel with their overlapping parts welded together in the same way as described before for the single blank. The sheet that form the bottom may even be preshaped, such as a bottom with flanged sides to produce a container with a so-called "kick" bottom. It is also possible to drape one single film over a mandrel and to seal the pleats overlappingly into the cylindrical, conical or rectangular wall of the container to be formed.

Suitable materials to implement the method according to the invention are foam plastic films and foam plastic sheets of thermoplastic resins that in themselves can be sealed by heat and pressure. If desired, these foam plastic sheets may be provided with a skin.

Suitable in particular are, i.a. foam plastic films and foam plastic sheets of polystyrene compositions such as polystyrene, polystyrene-rubber, and acrylonitrile-butadiene-styrene compositions (so-called ABS polymers) and impact-proof polystyrene; vinyl derivatives such as polyvinylchloride, copolymers of vinyl derivatives; and polyolefines such as polyethylene, polypropylene and their copolymers whether or not crosslinked. Preferably, however, polystyrene foam is used.

The most suitable sealing-temperature that is above the softening point for sealing polystyrene or crosslinked polyethylene may be obtained by heating the die sections up to about 120 to 130° C. Thus, contrary to all prognoses it was found that polystyrene foam can be sealed overlappingly in a very short time at temperatures between 120 and 130° C. The most suitable die temperautre for sealing polypropylene foam is 185° C. Various foam plastics such as for instance crosslinked polyethylene foam and crosslinked polypropylene foam can also be sealed at a considerable higher temperature, but this is little used, for reasons of economy. However, in some cases it can be useful to choose a higher temperature in order to obtain a correct seal at a somewhat lower pressure in a short time. Polystyrene foam cannot be sealed at a much higher temperature because then its foam structure is deteriorated.

BRIEF DESCRIPTION OF THE VIEWS

The above mentioned and other features, objects and advantages and a manner of attaining them are described more specifically below by reference to embodiments of this invention shown in the accompanying drawings, wherein.

DETAILED DESCRIPTION OF PREFERRED EMBODIMENTS

Figure 1:
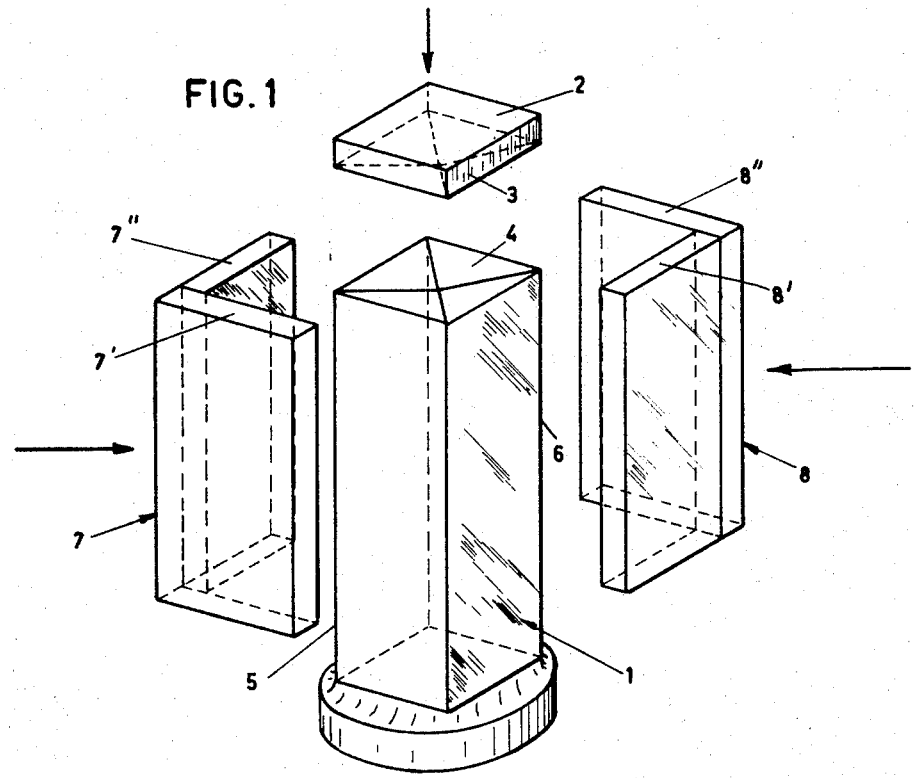
FIG. 1 is a perspective schematic view of one embodiment of an expanded mold for reforming a container of one litre according to this invention.

For application of the method a molding or reforming device according to FIG. 1 can be used. This device consists of a mandrel 1 with a rectangular cross-section and a height sufficient that its contents are more than one litre.

Figure 3:
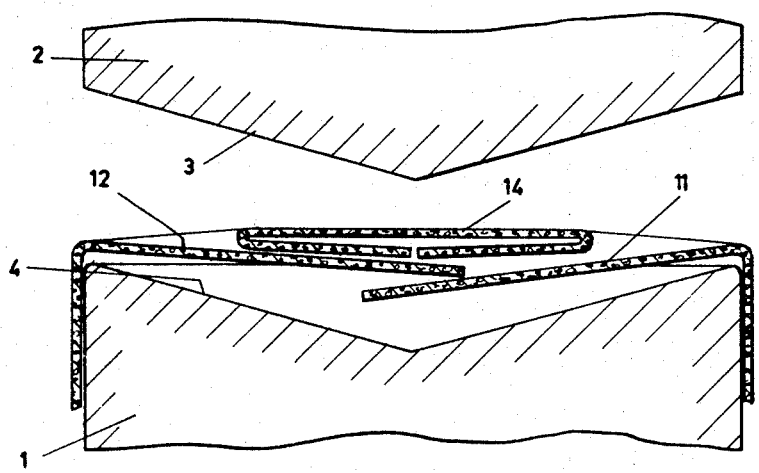
FIG. 3 is cross-section along line III—III of the bottom part of the container according to FIG. 2, showing the various layers of foam plastic sheet folded together in the mold before being reformed.
Figure 4:
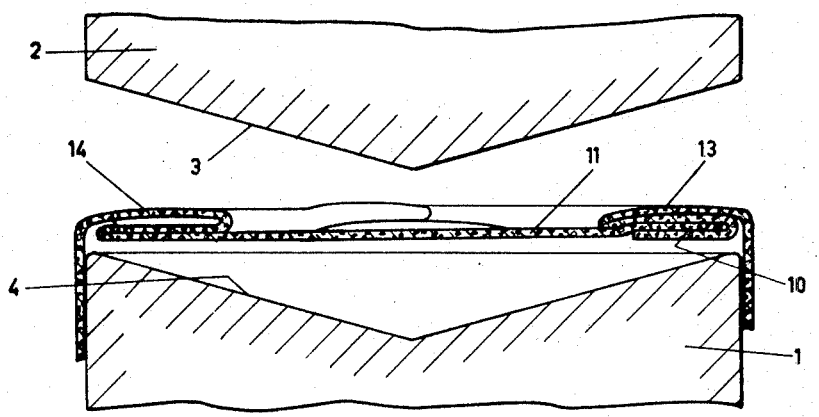
FIG. 4 is a cross-section similar to FIG. 3 but along line IV—IV of FIG. 2 before the folded sheets are reformed.

Over mandrel 1 a plunger 2 has been provided, whose bottom part is constructed as a four-sided pyramid 3 (see also FIGS. 3 and 4). In the upper part of mandrel 1 a recess 4 is provided coresponding to the pyramid 3.

Juxtaposed to mandrel 1 two die halves 7 and 8 are mounted, overlapping two opposite edges or ribs 5 and 6 of the mandrel 1. The die halves 7 and 8 are each formed out of two plates 7' and 7" and 8' and 8", which correspond to the side adjacent surfaces of mandrel 1 which adjoin ribs 5 and 6, respectively.

Mandrel 1, plunger 2, as well as die halves 7 and 8, are provided with means (not shown) to heat them to a certain temperature. Furthermore, it is possible to provide plunger 2 and plates 7 and 8 with cooling means also in order to enable rapid cooling of a single blank of foam plastic, after, of course, this blank had been in the device, heated and shaped into a container.

It is also possible, however, to shift mandrel 1 into a different position in the embodiment of the device, in which another plunger and other die halves are mounted, which are cold or can be cooled for cooling the reformed plastic sheets.

The heated plunger 2 and die halves 7 and 8, as well as a cold plunger and cold die halves, are mounted movably (in the direction indicated by the arrows in the drawing) toward and away from the mandrel 1. Thereby it is possible, when a single blank is folded around a mandrel 1, to fix the distance to the mandrel from plunger and die halves to both compress and heat the folded blank and then retract a predetermined distance to form the container so that the final thickness of the contained walls can be fixed.

However, the movement of the plunger and die halves is much greater when putting-in and taking-out the blank or the shaped container, and/or it is moved into a cooling position.

In the drawing a number of finger devices and guiding devices for folding a single blank in the appropriate shape for a bottom enclosure have been omitted, because these devices are generally known in the packing industry for folding and closing containers or boxes shaped from one single blank.

EXAMPLE I

Figure 2:
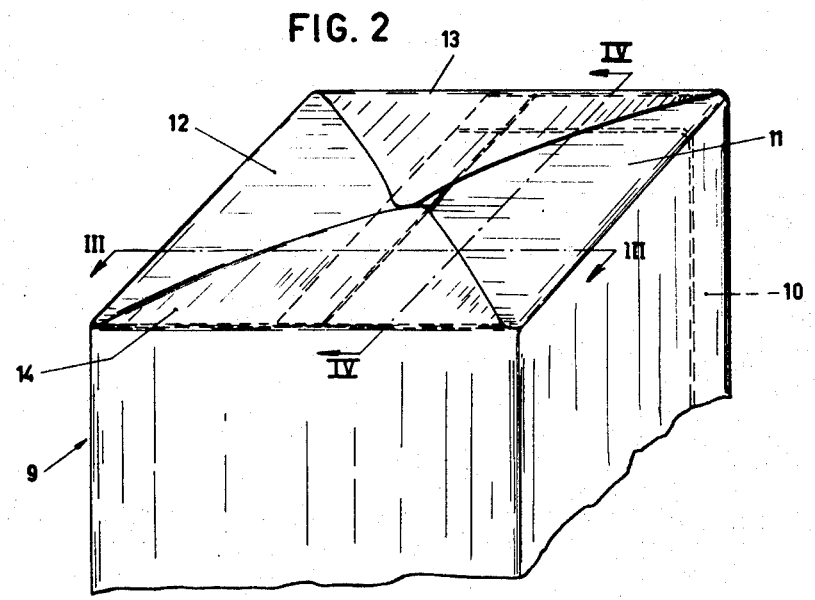
FIG. 2 is an enlarged perspective view of the bottom part of the container in turned-upside-down position before it is reformed in the molds shown in FIG. 1.

From a sheet of 3 mm. thickness, consisting of polystyrene foam with a density of 40 kg. per m.$^3$, a single blank of 10 g. was obtained by punching and grooving. This blank 9 (see FIG. 2) was folded into the shape of a rectangular container and, with its bottom to be sealed, it was turned up and placed on to a vertically mounted rectangular mandrel 1 having volume of well over 1 dm.$^3$.

Blank 9 is given a vertical overlapping seam 10 close to a rib 6 of the mandrel 1 and the uper part of the blank is folded in the known way with finger devices and guiding devices (not shown). To form the different flaps 11, 12, 13 and 14 whose cross-sections are shown in FIGS. 3 and 4. When folding a bottom in another way, differently shaped flaps can result but the gist of sealing is that a completely closed and integrated bottom is formed.

Figure 5:
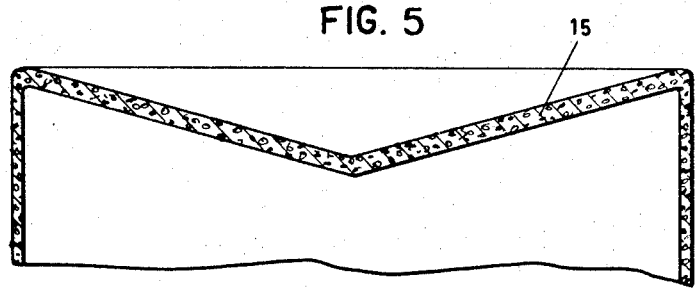
FIG. 5 is a cross-section according to that of FIG. 3, or 4, after the reforming or sealing into a closed bottom has been effected.

Mandrel 1 was heated to 122° C. The external planes of blank 9 were enclosed by a plunger 2 and die halves 7 and 8, which had been heated to 128° C. Blank 9 was compressed for four seconds with a pressure of 16 kg. per cm.² Next the pressure was reduced and the distance between the external die sections (plunger 2 and die halves 7 and 8) and mandrel 1 increased up to 3 mm. After some seconds, the external die sections 2, 7 and 8 were removed and replaced by cold die sections, with the same shape, which also were fixed at 3 mm. distance from mandrel 1. After cooling below the softening temperature, the external cold die sections and the plunger were removed and the container was stripped from mandrel 1. By compresisng the different layers of the flaps on to each other a container had been created with a completely closed and integrated bottom as is shown in cross-section in FIG. 5. This 10 g. container obtained had a uniform wall thickness, was amply sufficiently rigid and shock-proof so as to pack one litre of liquid and had perfectly fluid-tight sealed seams and a good appearance.

EXAMPLE II

From a sheet of 4 mm. thickness, consisting of polystyrene foam with a density of 30 kg. per m.³, a single blank of 10 g. was obtained by punching and grooving. This blank was folded in the same way as blank 9 mentioned in Example I and placed on to mandrel 1 of well over 1 dm.³, which had been heated up to 122° C.

The external planes of the blank were enclosed by three die sections that had been preheated at 128° C. Two die halves 7 and 8, adapted for enclosing the four sidewalls of the container, each consisted of two plates mounted perpendicularly on to each other, and plunger 2 for enclosing a bottom comprising a square plate provided with a circular embossing or kick instead of pyramid 3. In this case the upper part of mandrel 1 was a plane without a recess. The blank was compressed for five seconds with a pressure of 8 kg. per cm.² Next the pressure was reduced and the distance from the external die sections to mandrel 1 increased. The distance to mandrel 1 from the annular section around the embossing was enlarged to 4 mm. The distances to mandrel 1 from the circular embossing and from die halves 7 and 8 around the sidewalls were increased up to 3 mm. All die sections were fixed at this distance for three seconds. Next the external die sections were removed and replaced by cold die sections with the same shape, which were fixed at the same distances.

After cooling below the softening temperature the external die sections and mandrel 1 were removed. The 10 g. container obtained had a uniform wall thickness with an annular ridge of 1 mm. in its bottom. The container was amply sufficiently rigid and shock-proof so as to be able to pack one litre of liquid and had perfectly fluid-tight sealed seams and a good appearance.

EXAMPLE III

From a sheet of 2 mm. thickness consisting of polystyrene foam with a density of 35 kg. per m.³, a single blank of 7 grams was obtained by punching and grooving. This blank was folded in the same way as blank 9 mentioned in Example I and placed on to a mandrel 1, which had been heated up to 90° C.

The external planes of the blank were enclosed by the three external die sections, which had been heated at 140° C.

Plunger 2 and die halves 7 and 8 had the same shape as those mentioned in Example I. The blank was compressed for one second with a pressure of 16 kg. per cm.² Then the pressure was reduced and the hot external die sections were removed. The container was cooled by air on mandrel 1 and thereafter stripped from hot mandrel 1. A container of 7 grams with a correct seal was obtained, which was perfectly fluid-tight and sufficiently rigid so as to be able to pack one litre of liquid.

In spite of scars, from pleats of the flaps and from uneven wall thicknesses, at the external side, after all a technically useful product was obtained, whose wall thickness over the pleats was substantially equal to the thickness of one single layer.

EXAMPLE IV

From a sheet of 2 mm. consisting of polystyrene foam with a density of 35 kg. per m.³, a blank of 7 grams was obtained by punching and grooving. The blank was folded in the same way as mentioned in Example I and placed on to mandrel 1, which had been heated up to 126° C. The external die sections had been heated at 126° C., too. The folded blank was compressed for four seconds in such a way that the pressure was 12 kg. per cm.² at those places at which a seal had to be formed. Then the pressure was reduced and the hot external die sections were replaced by cold die sections, which had been provided with a letter profile in a high relief of 1.2 mm. The cold sections were placed against the foaming container in such a way that the mandrel surface remained at a distance of 1.9 mm. from mandrel 1.

Consequently the letter profile had been pressed into the container up to a foam thickness of 0.7 mm. After some seconds the cold die sections were removed and a container of 7 grams with a correct seal was obtained, which was perfectly fluid-tight and sufficiently rigid so as to be able to contain one litre of liquid. In the smooth surface of the container a clear letter imprint was visible in deep relief.

In the examples, polystyrene foam is mentioned of a rather low density. This can, for instance, be obtained by clamping a polystyrene film of Aphrolan with a thickness of 0.4 mm. and a density of 175 kg. per m.³ in a frame and by dipping the film for three minutes in a bath with boiling water. A foam plastic sheet was obtained with a thickness of 2 mm. and a density of 35 kg. per m.³. After cooling and maturing for 24 hours, out of this foam sheet blanks can be grooved and punched.

As a matter of fact films of foam plastics with other densities can be foamed in a corresponding way, before they are processed into blanks.

While there is described above the observed principles of this invention in connection with a specific method, it is to be clearly understood that there may be many unobserved side effects which contribute substantially to the efficiency of this method and that this description is made only by way of example and not as a limitation to the scope of this invention.

What is claimed is:

1. A method for overlapping sealing foam thermoplastic sheets, wherein at least two sheets with a density below 250 kilograms per cubic meter and with a predetermined uniform original thickness are to be joined, the steps comprising: laying at least part of one of these sheets on top of the other without a bonding agent, compressing at least opposite sides of the overlapped portions of said sheets into dies until their thickness is less than the original thickness of one sheet and at a temperature above the softening point of the plastic, decreasing the pressure applied by said dies by retracting the dies a predetermined distance, whereby the compressed product is foamed again at that temperature into an integral sheet of substantially the original thickness of said one sheet, and cooling at least one side of one die to set said reformed product.

2. A method according to claim 1, wherein the pressure is decreased by increasing the distance between the die sections until a predetermined foam plastic thickness is reached.

3. A method according to claim 1, wherein the thermoplastic foam sheets enclosed in the dies are compressed by means of a pressure of at least 2 kg. per cm.²

4. A method according to claim 1, wherein the thermoplastic foam sheet consists of polystyrene foam and is sealed at a temperature between 120 and 130° C.

5. A method according to claim 1, wherein the sealed product is a container manufactured from a folded single blank.

6. A product obtained according to the method of claim 1.

7. A product according to claim 6, characterized in that it is manufactured from a folded single blank and is provided with a completely integrated bottom, which is sealed out of folded flaps.

8. A method of reforming overlapped sheet portions of thermoplastic foam having a density below 250 kilograms per cubic meter and having a predetermined substantially uniform original sheet thickness, comprising:
  (A) overlapping at least two of said sheet portions,
  (B) compressing at least the overlapping sheet portions to a thickness less than the original thickness of one sheet at a pressure between about 2 and 50 kilograms per square centimeter and at a temperature between about the softening and melting states of said foam, and
  (C) releasing said pressure a predetermined amount while maintaining said temperature to reform the foam in said overlapped portions into an integral sheet with a thickness which is comparable with the thickness of the original sheet.

9. A method according to claim 8 including the step of cooling said reformed portion.

10. A method according to claim 8 wherein said thermoplastic foam is polystyrene.

11. A method according to claim 10 wherein said density of said polystyrene is between about 30 and 40 kilograms per cubic meter.

12. A method according to claim 10 wherein said polystyrene is compressed at a pressure between about 8 and 16 kilograms per square centimeter at a temperature between about 90° and 140° C.

13. A method according to claim 12 wherein said temperature is between about 120° and 130° C.

14. A method according to claim 8 wherein said compressing is performed by cooperating dies.

15. A method according to claim 14 wherein said releasing of pressure a predetermined amount is caused by retracting said dies a predetermined distance.

16. A method according to claim 14 wherein said cooling is performed by a different set of dies than used for said compressing.

17. A product produced by the method of clam 8.

18. A container having a bottom formed on a die from a thermoplastic sheet and reformed according to the method of claim 8.

19. A method according to claim 1 wherein said compressing of said overlapped sheet portions is to about twenty percent of the thickness of one original sheet.

20. A method according to claim 1 wherein said compressing of said overlapped sheet portions is for a duration from about one to six seconds.

21. A method according to claim 8 wherein said compressing of said overlapped sheet portions is to about twenty percent of the thickness of one original sheet.

22. A method according to claim 8 wherein said compressing of said overlapped sheet portions is for a duration from about one to six seconds.

References Cited
UNITED STATES PATENTS 3,069,725   12/1962   Root _____ 264—248
3,315,018   4/1967   Commeyras _____ 264—321

WILLIAM J. VAN BALEN, Primary Examiner

U.S. Cl. X.R.

156—77, 157, 228, 304, 306; 161—69, 145; 229—48 T; 264—46, 51, 248, 321